J. McMURTRY.

Cotton Bale-Ties.

No. 5,617. Reissued Oct. 21, 1873.

Attest
A. Campbell
Charles H. Smith.

Inventor
John McMurtry.

AM. PHOTO-LITHOGRAPHIC CO. N.Y. (OSBORNE'S PROCESS)

UNITED STATES PATENT OFFICE.

JOHN McMURTRY, OF LEXINGTON, KY., ASSIGNOR TO FREDERIC COOK.

IMPROVEMENT IN COTTON-BALE TIES.

Specification forming part of Letters Patent No. 58,445, dated October 2, 1866; reissue No. 5,617, dated October 21, 1873; application filed June 7, 1873.

*To all whom it may concern:*

Be it known that I, JOHN McMURTRY, of Lexington, Fayette county, Kentucky, have invented an Improvement in Bale-Ties, of which the following is a specification:

My invention consists in the formation of a tie by hooking or looping one end of a metallic band or strap onto or into the other and holding it in position by the expansion of the bale.

The band may be of ordinary or galvanized hoop-iron, and it is applied as follows: When the bale has been sufficiently compressed in the ordinary process of pressing, the band or hoop is passed around it, and one end of it is formed into a loop. This loop may be made either by folding the end directly under against the body of the band or by folding it under and at the same time giving it a half twist. For greater security, as well as convenience in manipulation, the end, when thus turned under, may be secured to the body of the band by riveting; or, if preferred, the expansive force of the bale may be availed of, as hereinafter indicated, to maintain the loop.

Figure 1:
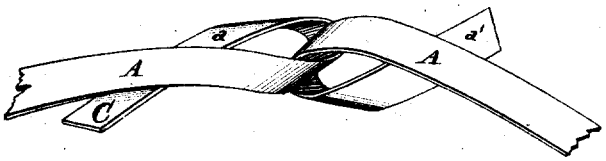
Figure 2:
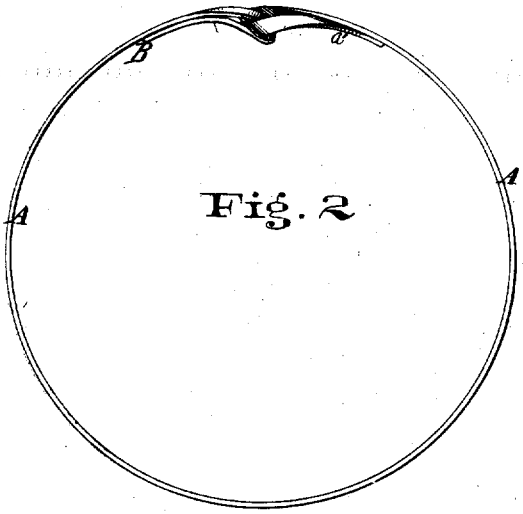
Figure 3:
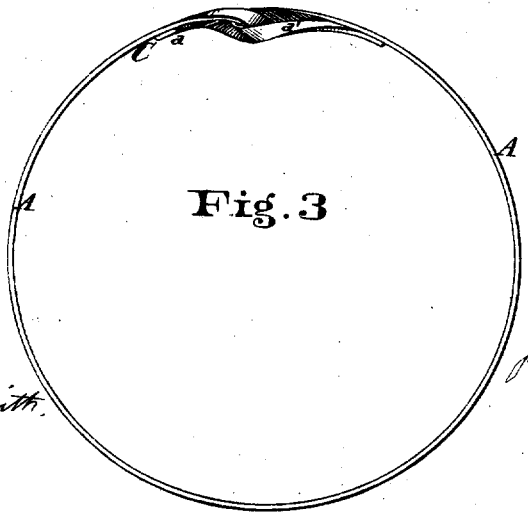

Figures 1 and 3 of the accompanying drawing show the loop as formed by a half twist of the end A *a* C, Fig. 1 giving a plan view of the two ends of the band, and Fig. 3 a side view of the entire band or hoop. Fig. 2 is a side view of the band having the loop formed by simply bending the end B back under the body thereof without any twist.

A loop having been formed in one end of the hoop, the other end is then thrust through this loop, and, being drawn sufficiently tight to take up the slack, is bent back and folded under the body of the band, as shown at *a'*.

When the press is relaxed the expansion of the bale will confine the ends of the band immovably in place.

From the above description it will be apparent that my invention differs essentially from the use of wires and ropes having their ends wound or twisted around the body of the same.

What I claim is—

1. A bale-tie formed by the attachment of one end of a metallic band or strap to the other by looping it into or onto or engaging it with the same, the end thus engaged with the other being confined in position by the expansive force of the bale.

2. A metallic bale-band having one end formed into a plain or half-twist loop for the reception or interlocking of the other, substantially as hereinbefore described.

JOHN McMURTRY.

Witnesses:

JESSE P. OWENS,

ALBERT N. HARRIS.